(12) United States Patent
Szolyga et al.

(10) Patent No.: US 7,731,408 B2
(45) Date of Patent: Jun. 8, 2010

(54) LIGHT SOURCE SHINING THROUGH A TEMPLATE ON TO A BASE

(75) Inventors: Thomas H. Szolyga, Saratoga, CA (US); Ashwin V. Lodhia, Mountain View, CA (US); Mark C. Solomon, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 28 days.

(21) Appl. No.: 11/830,383

(22) Filed: Jul. 30, 2007

(65) Prior Publication Data

US 2009/0034044 A1   Feb. 5, 2009

(51) Int. Cl.
*F21V 7/04* (2006.01)
(52) U.S. Cl. .................. 362/612; 362/602; 362/632; 362/800

(58) Field of Classification Search .................. 362/23, 362/85, 555, 602, 612, 632, 800; 361/379, 361/684, 683, 23, 85, 679.01–679.02, 379.21
See application file for complete search history.

(56) References Cited

U.S. PATENT DOCUMENTS

| | | | |
|---|---|---|---|
| 6,030,088 A * | 2/2000 | Scheinberg | 362/85 |
| 6,179,432 B1 * | 1/2001 | Zhang et al. | 362/85 |
| 6,685,351 B2 * | 2/2004 | Chen | 362/555 |
| 6,977,808 B2 * | 12/2005 | Lam et al. | 361/681 |
| 2003/0002246 A1 * | 1/2003 | Kerr | 361/683 |

* cited by examiner

*Primary Examiner*—Sandra L O'Shea
*Assistant Examiner*—Meghan K Dunwiddie

(57) ABSTRACT

A system in at least some embodiments comprises a housing containing a processor and a base coupled and supporting the housing. The housing comprises a slot adapted to receive a removable template. A slot is provided within the housing. The slot is adapted to receive a removable template. The housing also comprises a light source that shines through the template on to the base.

16 Claims, 1 Drawing Sheet

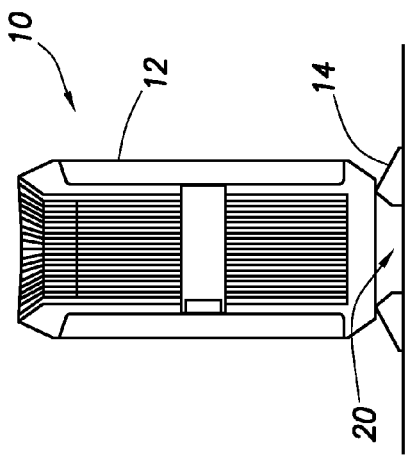
FIG.1
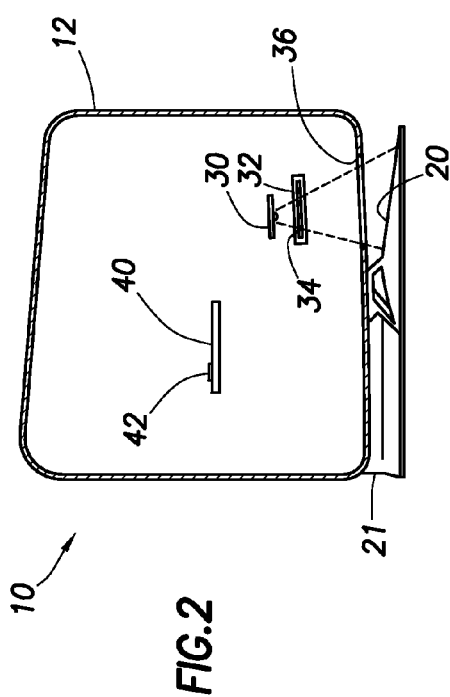
FIG.2
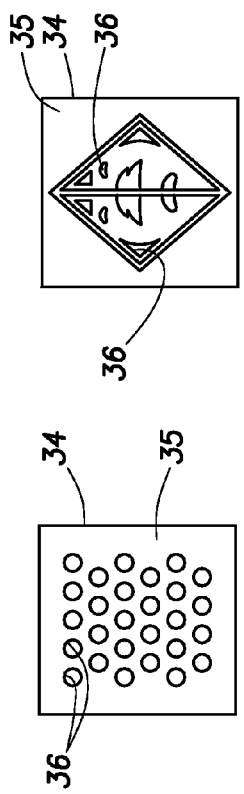
FIG.3
FIG.4
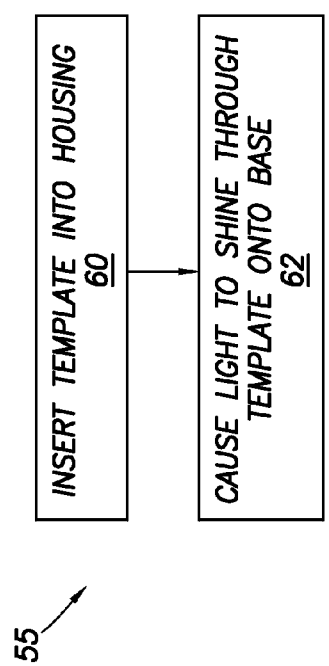
FIG.5

LIGHT SOURCE SHINING THROUGH A TEMPLATE ON TO A BASE

BACKGROUND

For at least some electronic systems (e.g., gaming computers), the "look and feel" of the system is important to the customer.

BRIEF DESCRIPTION OF THE DRAWINGS

For a detailed description of exemplary embodiments of the invention, reference will now be made to the accompanying drawings in which:

FIG. 1 shows a system in accordance with various embodiments;

FIG. 2 shows a side view of the system of FIG. 1 in accordance with various embodiments;

FIG. 3 shows an example of a template used in the system of FIGS. 1 and 2 in accordance with various embodiments;

FIG. 4 shows another example of a template used in the system of FIGS. 1 and 2 in accordance with various embodiments; and FIG. 5 shows a method in accordance with various embodiments.

NOTATION AND NOMENCLATURE

Certain terms are used throughout the following description and claims to refer to particular system components. As one skilled in the art will appreciate, computer companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect, direct, optical or wireless electrical connection. Thus, if a first device couples to a second device, that connection may be through a direct electrical connection, through an indirect electrical connection via other devices and connections, through an optical electrical connection, or through a wireless electrical connection.

DETAILED DESCRIPTION

In accordance with various embodiments, the "look and feel" of an electronic system is increased by the use of light source that emits light through a template thereby creating a light pattern on a base of the system. FIG. 1 illustrates an example of such an electronic system.

FIG. 1 illustrates an electronic system 10 in accordance with at least some embodiments. FIG. 1 illustrates a front view of the electronic system 10 from the vantage point of a user who may be positioned in front of the system. The electronic system 10 comprises, for example, a computer system. As shown, the electronic system 10 comprises a housing 12 supported by a base 14. FIG. 2 illustrates a side view of system 10. As best seen in FIG. 2, the housing 12 is supported above the base 20 via a support column 21 provided at a rear portion of the base 20.

In FIG. 2 a side panel has been removed to illustrate at least some of the internal components of the housing 12. As shown, a circuit board 40 (e.g., a system board) comprises host logic 42 such as a processor. FIG. 2 also shows a light source 30 which emits light. A slot 32 is also provided within the housing 12. The slot 32 is formed in the material that comprises the housing itself or is otherwise included within the volume of space confined by the housing 12. The slot 32 is adapted to receive a removable template 34. The housing 12 further comprises an aperture 36 provided in an outer surface of the housing in the illustrative embodiment of FIG. 2. Light from the light source 30 shines through the template 32 and aperture 36 to form a light pattern on base 20. The light pattern is thus viewable by a user of the system 10 and enhances the "look and feel" of the system.

In various embodiments, the removable template 34 comprises one or more holes through which light from the light source can shine. FIGS. 3 and 4 depict two examples of template 34. The template 34 is generally formed of a solid material 35 such as metal or plastic. One or more holes 36 are formed in the template to form a pattern. Light shining from the light source through the holes 36 in template 34 generally reproduces the pattern on base 20. The template embodiments shown in FIGS. 3 and 4 are merely examples of a multitude of different templates that are possible. Each template 34 comprises a size that fits within slot 32 in the housing. In the embodiment shown in FIGS. 3 and 4, the template 34 is generally rectangular, but in other embodiments, the template can be other than rectangular (e.g., square, circular, etc.).

FIG. 5 illustrates a method 55 in accordance with various embodiments. Referring to FIGS. 2 and 5, at 60, a user inserts a template 34 into the slot 32 in the housing 12. This action can be performed by the user removing a side panel of the housing 12. In various embodiments, the slot 32 is accessible to the user by opening a hinged door to reveal the slot 32. After inserting the desired template 34 into slot 32, the user then causes light to shine through the template 34 and aperture 36 onto the base 20 (action 62). The light pattern thus cast on base 20 generally replicates the pattern formed in the template 34. Action 62 is performed by, for example, the user turning power on to the system 12. In other embodiments, the light source 30 can be turned on and off by the user activating a manual switch or software control after the system 10 has been powered on. As desired, a user can replace the template 34 with another template by gaining access to slot 32 (e.g., removing a side panel to the housing 12), removing the template 34 already installed in slot 32, and inserting a new template 34 into the vacant slot 32.

In various embodiments, the light source comprises a light emitting diode (LED). In other embodiments, the light source 30 comprises an electroluminescent strip. In various embodiments, the light source may comprise white light or any of a variety of colors of light. As desired, a light diffuser can be included to be disposed between the light source 30 and template 34 to create a evenly distributed light density through the template 34. The use of such a diffuser may help to alleviate the center portion of the light pattern on the base 20 from being significantly brighter than the peripheral edges of the light pattern, thereby creating a more uniform light pattern on the base 20.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A system, comprising:

a housing containing a processor; and a base coupled to and supporting said housing;

wherein a slot is provided within said housing, said slot is adapted to receive a removable template, and said housing also comprises a light source that shines through said template on to said base.

2. The system of claim 1 wherein the light source comprises a light emitting diode.

3. The system of claim 1 wherein the light source comprises an electroluminescent strip.

4. The system of claim 1 wherein the light source generates colored light.

5. The system of claim 1 further comprising a light diffuser disposed between said light source and said template.

6. The system of claim 1 wherein the system comprises a computer.

7. The system of claim 1 wherein the template comprises a pattern which is projected on said base when said light source shines through said template.

8. The system of claim 1 wherein the template comprises a material selected from a group consisting of metal and plastic.

9. The system of claim 1 wherein the housing further comprises an aperture provided in an outer surface of said housing through which light from the light source shines on to the base.

10. The system of claim 1 wherein the housing couples to the base via a support column at a rear portion of said base.

11. The system of claim 10 wherein the light from the light source shines on a front portion of said base.

12. The system of claim 1 wherein the template comprises one or more holes through the light source shines on to the base.

13. The system of claim 1 wherein the light source shines downward through the template and on to said base.

14. A method, comprising:

inserting a template into a computer housing; and causing light to shine through said template onto a base of said housing.

15. The method of claim 14 further comprising replacing said template with another template.

16. The method of claim 14 wherein causing the light to shine comprises causing light to shine downward through said template onto a base of said housing.

* * * * *